US009338035B2

(12) United States Patent
Mach

(10) Patent No.: US 9,338,035 B2
(45) Date of Patent: May 10, 2016

(54) MICROCONTROLLER WITH CAN BUS MODULE AND AUTO SPEED DETECT

(75) Inventor: Joel Mach, Gilbert, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 1029 days.

(21) Appl. No.: 13/041,535

(22) Filed: Mar. 7, 2011

(65) Prior Publication Data

US 2012/0233341 A1 Sep. 13, 2012

(51) Int. Cl.
*G06F 15/16* (2006.01)
*H04L 25/02* (2006.01)
*H04L 29/06* (2006.01)

(52) U.S. Cl.
CPC ............ *H04L 25/0262* (2013.01); *H04L 29/06* (2013.01)

(58) Field of Classification Search
CPC ............................ H04L 25/0262; H04L 29/06
USPC .................................................. 709/228, 227
See application file for complete search history.

(56) References Cited

U.S. PATENT DOCUMENTS

| 5,371,766 A | 12/1994 | Gersbach et al. ............. 375/119 |
| 2006/0123176 A1* | 6/2006 | Fredriksson ........ G06F 13/4291 710/305 |
| 2008/0246549 A1* | 10/2008 | Chen .......................... G06F 1/14 331/185 |

FOREIGN PATENT DOCUMENTS

WO 03/058468 A1 7/2003 ............. G06F 13/36

OTHER PUBLICATIONS

Wegner, A., "Practical Techniques for Baud Rate Estimation", Institute of Electrical and Electronics Engineers; Proceedings of the International Conference on Acoustics, Speech and Signal Processing, vol. 4, pp. 681-684, Mar. 23, 1992.
International PCT Search Report and Written Opinion, PCT/US2012/026010, 13 pages, Jun. 15, 2012.
Japanese Office Action Application No. 2013-557739, 5 pages, Nov. 13, 2015.
Chinese Office Action, Application No. 201280012061.9, 5 pages, Aug. 3, 2015.

* cited by examiner

*Primary Examiner* — Suraj Joshi
*Assistant Examiner* — Joel Mesa
(74) *Attorney, Agent, or Firm* — Slayden Grubert Beard PLLC

(57) ABSTRACT

In a method for initializing a Controller Area Network (CAN) module in a microcontroller, the following steps may be provided: measuring the period times between a plurality of falling or rising edges of a CAN signal; sorting the period times; determining difference values between adjacent period times of the sorted period times; sorting the difference values; selecting a first difference value from the sorted difference values and determining a first frequency from the first difference value; initializing the CAN module using the selected frequency; receiving a CAN signal frame; determining whether an error occurred; if an error occurred selecting a next frequency and repeating initializing the CAN module until a valid CAN frequency has been found.

21 Claims, 3 Drawing Sheets

MICROCONTROLLER WITH CAN BUS MODULE AND AUTO SPEED DETECT

TECHNICAL FIELD

The present invention relates to microcontrollers having a Controller Area Network (CAN) module.

BACKGROUND

Controller Area Network (CAN) is a serial communications protocol which efficiently supports distributed real-time control with a high level of security. Applications of CAN range from high speed digital communications networks to low cost multiplex wiring. CAN is a high-integrity serial data communications bus for real-time applications. CAN operates at data rates of up to 1 Megabits per second, has excellent error detection and confinement capabilities, and was originally developed for use in automobiles. The motivation behind CAN was to make automobiles more reliable, safe and fuel-efficient by improving the interoperability of automotive electronics, engine control units, sensors, anti-skid brake systems, etc., while decreasing wiring harness weight and complexity. Since CAN's inception, the CAN protocol has gained widespread popularity in industrial automation and automotive/truck applications. The robustness of the CAN bus in noisy environments and the ability to detect and recover from fault conditions makes CAN suitable for use with, industrial control equipment, medical equipment, test equipment, mobile and portable machines, appliances, etc.

CAN is an asynchronous serial bus system with one logical bus comprising for example two wires. It has an open, linear bus structure with equal bus nodes. A CAN bus consists of two or more nodes. The number of nodes on the bus may be changed dynamically without disturbing the communication of the other nodes.

The CAN logic bus corresponds to a "wired-OR" mechanism, "recessive" bits (mostly, but not necessarily equivalent to the logic level "1") are overwritten by "dominant" bits (mostly logic level "0"). As long as no bus node is sending a dominant bit, the bus line is in the recessive state, but a dominant bit from any bus node generates the dominant bus state. Therefore, for the CAN bus line, a medium is chosen that is able to transmit the two possible bit states (dominant and recessive). A common physical medium used is a twisted wire pair. The bus wires are then called "CANH" and "CANL," and may be connected directly to the CAN controller nodes or via a connector thereto.

In the CAN bus protocol it is not bus nodes that are addressed, but rather the address information is contained in the messages that are transmitted. This is done via an identifier (part of each message) which identifies the message content, e.g., engine speed, oil temperature, etc. The identifier additionally indicates the priority of the message. The lower the binary value of the identifier, the higher the priority of the message (more dominant bits).

In a CAN controller the architecture is similar to a simple UART, except that complete frames are sent instead of characters: there is (typically) a single transmit buffer, and a double-buffered receive buffer. The CPU puts a frame in the transmit buffer, and takes an interrupt when the frame is sent; the CPU receives a frame in the receive buffer, takes an interrupt and empties the buffer (before a subsequent frame is received). The CPU must manage the transmission and reception, and handle the storage of the frames."

During initialization the transmitting device and the receiving device generally program their respective CAN modules to use a predetermined CAN frequency. However, in many applications this frequency may not be known. Also, the length of each CAN bit can vary by approximately 20% around some nominal length. Moreover, in a running system, there are no "known initialization transmissions" to which a system can be synchronized. In other words, if a device is coupled to an already established CAN bus system, the content of the transferred messages is unknown. Thus, in conventional systems, a trial and error method may be used to determine the correct operating frequency of the CAN Bus which can result in a very long set-up time or may even fail entirely. In other serial bus systems, an initialization phase may be performed using synchronizing character sequences such as "5555" or "AAAA". However, such initialization routines may not be available in particular if a CAN bus is already be in operation.

Hence, there is a need for an improved auto-speed detect system and method for a microcontroller with a CAN module which allows for a quick determination of an operating frequency used in a CAN system.

SUMMARY OF THE INVENTION

According to an embodiment, a method for initializing a Controller Area Network (CAN) module in a microcontroller, may comprise: measuring the period times between a plurality of falling or rising edges of a CAN signal; sorting the period times; determining difference values between adjacent period times of the sorted period times; sorting the difference values; selecting a first difference value from the sorted difference values and determining a first frequency from the first difference value; initializing the CAN module using the selected frequency; receiving a CAN signal frame; determining whether an error occurred; if an error occurred selecting a next frequency and repeating initializing the CAN module until a valid CAN frequency has been found.

According to a further embodiment, the method may also comprise: coupling an external CAN line with an input of a capture module of the microcontroller to measure the period times. According to a further embodiment, the method may further comprise: feeding a CAN signal internally to an input of a capture module of the microcontroller to measure the period times. According to a further embodiment, the method may further comprise: after the step of sorting the difference values, the step on discarding difference values that result in invalid frequencies. According to a further embodiment, a timer and capture unit can be used to measure the period times. According to a further embodiment, ten period times between falling edges of a CAN signal may be measured. According to a further embodiment, the method may be repeated if no valid frequency is found. According to a further embodiment, the step of determining a frequency from the difference value may be performed using a look-up table. According to a further embodiment, the step of determining a frequency from the difference value may use rounding or truncation to calculate a frequency. According to a further embodiment, the microcontroller may be programmed to perform the method. According to a further embodiment, the microcontroller may comprise a state machine that performs the method.

According to another embodiment, a microcontroller may comprise: a central processing unit (CPU), a Controller Area Network (CAN) module, a timer, a capture module coupled with the timer, wherein the microcontroller is configured to automatically detect a CAN frequency by: measuring the period times between a plurality of falling or rising edges of a CAN signal; sorting the period times; determining differences between adjacent period times of the sorted period times; selecting a first difference and determining a first frequency from the first difference; initializing the CAN module using the selected frequency; receiving a CAN signal frame; determining whether an error occurred; if an error occurred selecting a next frequency and repeating initializing the CAN module until a valid CAN frequency has been found.

According to a further embodiment of the microcontroller, the microcontroller may be further configured to discard difference values that result in invalid frequencies. According to a further embodiment of the microcontroller, the capture module may comprise an edge detector controlling a driver which couples the timer with a capture register. According to a further embodiment of the microcontroller, the microcontroller may comprise a controllable driver coupled between an input of the CAN Bus module and the input of the capture module. According to a further embodiment of the microcontroller, the microcontroller may be configured to determine a frequency from the difference value by using a look-up table. According to a further embodiment of the microcontroller, the microcontroller may be configured to determine a frequency from the difference value using rounding or truncation. According to a further embodiment of the microcontroller, the microcontroller may be programmed by software to determine the CAN frequency. According to a further embodiment of the microcontroller, the microcontroller may comprise a state machine to determine the CAN frequency. According to a further embodiment of the microcontroller, the microcontroller may comprise a special function register to control the state machine.

DETAILED DESCRIPTION OF THE PREFERRED EMBODIMENT

Figure 1:
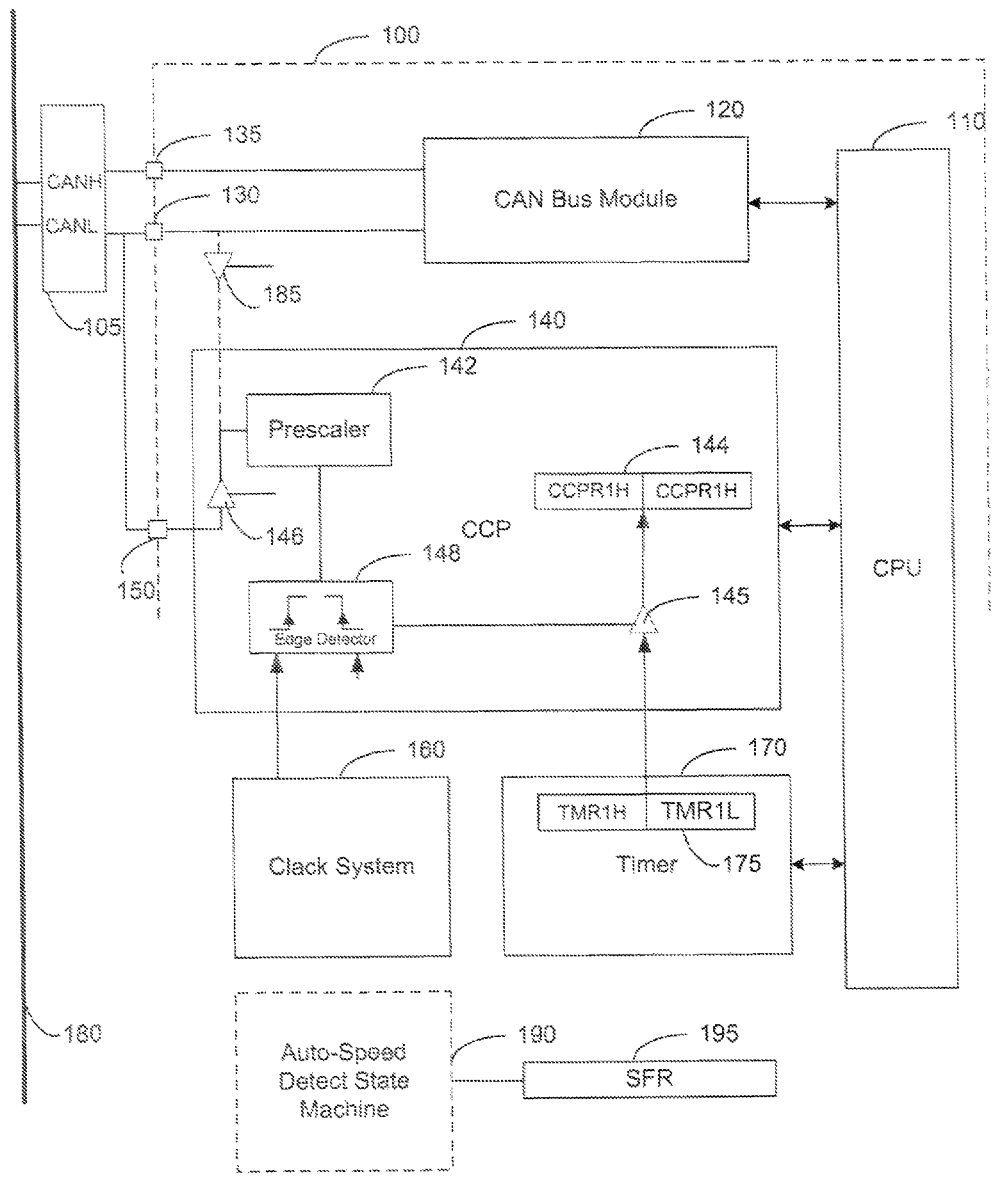
FIG. 1 is a block diagram of an embodiment of a microcontroller with integrated CAN module.

Referring to FIG. 1, a microcontroller 100 is indicated by the dotted line. The microcontroller 100 comprises a central processing unit (CPU) 110 and a CAN Bus module or peripheral device which is coupled with the CPU 110. External pins 130 and 135 are provided through which the CAN Bus module 120 can connect its separate transmit and receive lines CANTX, CANRX to the twisted pair CANH and CANL lines of the external CAN Bus 180. This is usually done via an external interface driver 105 that converts the separate internal signals CANRX and CANTX to respective CAN Bus signals CANH and CANL. However, other embodiments may provide internally for such an interface device to allow direct connection to a CAN bus.

Furthermore, the microcontroller comprises a capture/compare/pulse width modulation (CCP) module 140, a timer module 170 and a clock system 160, all coupled with CPU 110. The CCP unit 140 is coupled with another external pin 150 for evaluating external signals. To this end, according to an embodiment, a controllable driver 146 inside the CCP module 140 may be connected to external pin 150. However, the exemplary device shown in FIG. 1 may also be capable of evaluating/processing internal signals as shown by the dotted lines. For example, in one embodiment, the internal CAN signal CANRX can be fed through a controllable driver 185 to the CCP module 140. This embodiment may be considered in particular when, an internal CAN Bus interface 105 is present to allow for an evaluation of the internal CANRX signals. However, as will be appreciated by a person skilled in the art, other embodiments may allow to evaluate the CAN Bus lines directly. In such a case a differential driver/converter unit which is arranged internally or externally may be used to convert the signals on the CAN Bus into a single digital signal and feed them to the CCP module 140.

CCP module 140 may comprise a prescaler 142 which receives the output of drivers 146 and 185 and any other controllable driver that may be implemented to select an internal or external input signal. The output of prescaler 142 is coupled with an edge detector 148 which can programmably either detect a rising or falling edge of the incoming signal. The output signal of this edge detector controls a further driver 145 which couples a timer register 175 of timer module 170 with capture register 144 of CCP module 140. Edge detector 160 may receive a clock signal from, clock system 160.

To provide for a auto-speed detect function, the input of the CCP module, or one of its inputs in case the CCP module comprises multiple inputs, is coupled with the CANRX line as available on pin 130. As shown in FIG. 1, this can be done either by connecting external pin 150 with the CANRX pin 130 or selecting an internal coupling via controllable driver 185. This setup is necessary only during the auto-speed detect phase. Once the speed has been determined, the CCP input can be used for processing other signals.

Figure 2:
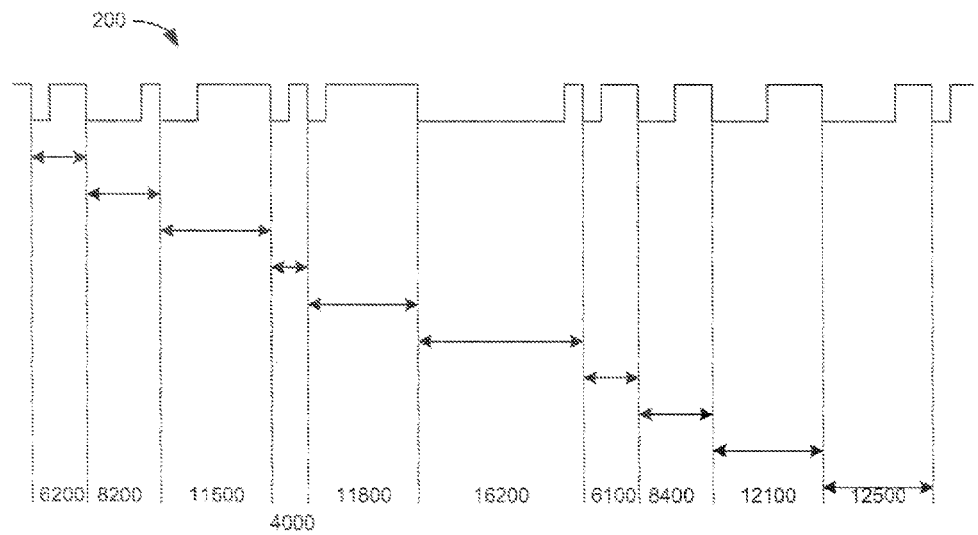
FIG. 2 shows a timing diagram of an exemplary CAN signal.

FIG. 2 shows an exemplary signal on external CAN Bus 180. The CCP module 140 is programmed to analyze the falling edges of the CAN signal 200. However, in other embodiments, different signal characteristics may be analyzed to determine a period. According to FIG. 2 every time a falling edge occurs, the CCP module 140 captures the timer value from timer module. Exemplary timer values that have been captured are shown. Values are rounded to the nearest 100 merely to facilitate understanding the principle of the method. In the example shown in FIG. 2, ten falling edges are investigated. However, more or less edges can be processed. The more edges are captured the more precise the auto-speed detection will become. The timer may be initialized with a resolution of 100 ns. To this end, the timer may be clocked at 10 MHz or any other suitable clock frequency. The timer values can be for example 16-bit values as shown in FIG. 1. Thus, depending on the clock source, different resolutions can be obtained. The better the timer resolution, the more exact the measurements. Using the fastest possible timer source is the preferred method as it increases the resolution of the timer. For example, a 40 MHz clock can be used to improve the timer resolution to 25 ns. These timer values can then be stored in an array.

Figure 3:
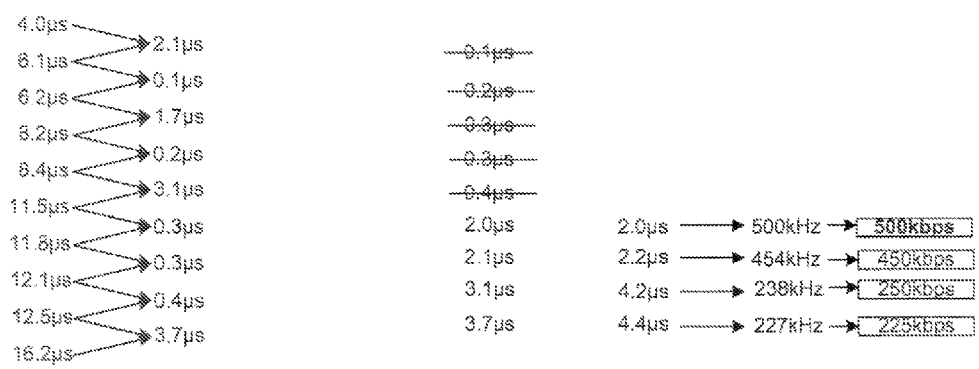
FIG. 3 shows a principle according to an embodiment to determine a CAN operating frequency.

FIG. 3 shows how the captured timer values are further processed. In a first step, the array with the ten captured timer values is sorted from smallest to highest values as shown in the most left column. Then, the difference between each two adjacent timer values is calculated as shown in the second column. Next, the different difference values are sorted again as shown in the third column. In another step, invalid differences may be discarded. For example, values that are clearly below 1 µs or any predetermined maximum period or over a predetermined maximum frequency may be discarded as shown in the third column in FIG. 3. For the remaining values as shown in the fourth column in FIG. 3, the resulting frequencies for the remaining period values are determined. The first value is then used for setting the frequency of the CAN module. To this end, according to an embodiment, a window may be used to round the frequency to the nearest number that makes sense in a CAN system. For example, 250 kbps or 275 kbps but not 263 kbps. Once this frequency has been determined, for example 500 kbps as shown in FIG. 3, the CAN module 120 is initialized using this frequency and set into a "Listen Only" mode so that normal bus traffic is not disrupted. Then, the system waits and determines whether a received message is valid or an error message is produced by the CAN module. In case of an error message, the auto-speed detect method selects the next available frequency as shown in FIG. 3, for example, 450 kbps. These steps are repeated until the correct frequency is set. Thus, the method repeats initializing the CAN module 120 using the different frequencies as determined in the last column shown in FIG. 3. If none of these determined values is produces a correct setting, the method starts again and evaluates another ten edges of a CAN signal.

The timer difference values as shown in the fourth column in FIG. 3 may be directly used to access a table that contains the actual frequency values. Such a method would allow to easily perform a truncation or rounding to obtain useful frequency values.

Figure 4:
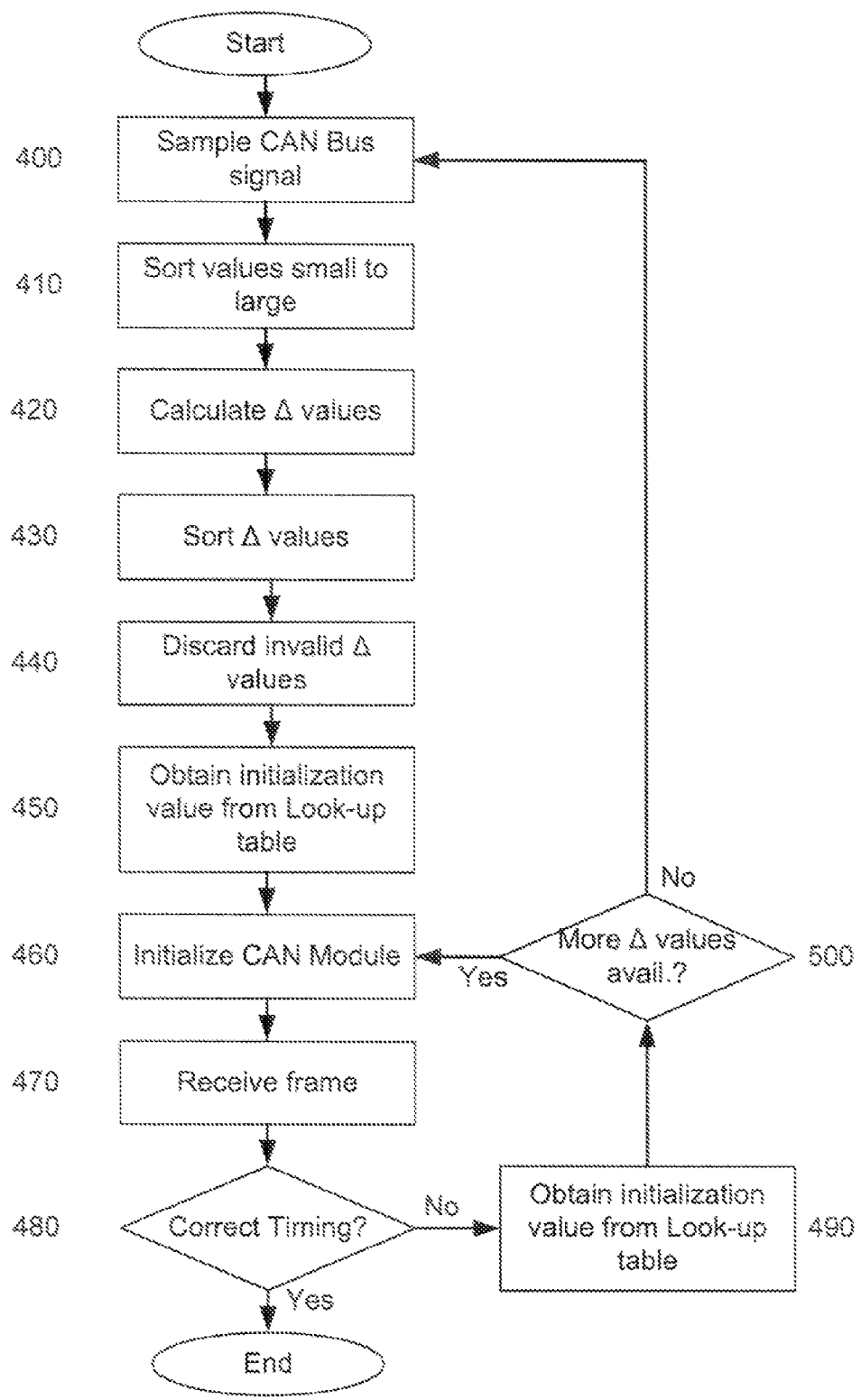
FIG. 4 shows a flow chart according to an embodiment.

FIG. 4 shows an exemplary flow chart of the above described method. In Step 400, the CAN signal is evaluated using the CCP module by detecting falling or rising edges and storing the associated timer values t(1) to t(n). These values are then sorted into values ts(1)-ts(n) in step 410. In step 420 the Δ values d(1)-d(n−1) are determined by calculating d(x) =ts(x+1)-ts(x), for x=1 ... n−1. The Δ values are sorted again into ds(1) ... ds(n−1) in step 430. Then, optionally in step 440, values ds( ) that do not form valid frequencies are discarded. The remaining values are used to determine frequency values f(x)=1/ds(x) in step 450. In step 460 the first value f(1) is used to initialize the CAN module 120. Then, in step 470 a frame is received. Correct timing is determined in step 480 by checking whether the CAN module generated any error messages. If not, then the routine ends. In case an error was generated then the routine proceeds by obtaining the next value f(i), for example, by using a look-up table in step 490. In step 500 it is determined whether there are no more values available. IF so, the routine jumps to step 500, other wise, the routine jumps to step 460.

According to an embodiment, the above described sequence can be performed by software. However, according to another embodiment, a state machine 190 may be used to control the specific sequences as described above. FIG. 1 shows the state machine 190. This state machine would in particular be advantageous in a microcontroller 100 that is capable of selecting the input signal to the CAN Bus module 120 internally, for example through controllable driver 185 as shown in FIG. 1. The state machine could be started through setting a bit in a special function register 195. Once started, State machine 190 couples the internal CAN bus signal via driver 185 to the CCP module 140, performs the initialization of CAN module 120 as described above and disconnects the CAN signal from the CCP module 140. A user may then use this module for the evaluation of other signals.

The invention, therefore, is well adapted to carry out the objects and attain the ends and advantages mentioned, as well as others inherent therein. While the invention has been depicted, described, and is defined by reference to particular preferred embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A method for initializing a Controller Area Network (CAN) module in a microcontroller,
    the method comprising:
        measuring period times between a plurality of falling or rising edges of a CAN signal;
        sorting said period times by their respective value;
        determining difference values between adjacent period times of said sorted period times;
        sorting said difference values by their respective value;
        selecting a first difference value from said sorted difference values and determining a first frequency from said first difference value;
        initializing said CAN module using said selected frequency;
        receiving a CAN signal frame;
        determining whether an error occurred;
        in response to said determining of an error, selecting a next difference value from said sorted difference values and determining an associated frequency and repeating initializing the CAN module until a valid CAN frequency has been found.

2. The method according to claim 1, further comprising coupling an external CAN line with an input of a capture module of said microcontroller to measure said period times.

3. The method according to claim 1, further comprising feeding a CAN signal internally to an input of a capture module of said microcontroller to measure said period times.

4. The method according to claim 3, wherein ten period times between falling edges of a CAN signal are measured.

5. The method according to claim 1, further comprising after the step of sorting said difference values, the step of:
    discarding difference values that result in invalid frequencies.

6. The method according to claim 1, wherein a timer and capture unit is used to measure the period times.

7. The method according to claim 1, wherein the method is repeated if no valid frequency is found.

8. The method according to claim 1, wherein the step of determining a frequency from said difference value is performed using a look-up table.

9. The method according to claim 1, wherein the step of determining a frequency from said difference value uses rounding or truncation to calculate a frequency.

10. The method according to claim 1, further comprising the step of programming the microcontroller to perform the method.

11. The method according to claim 1, wherein the microcontroller comprises a state machine and further comprising the step of performing the method by the state machine.

12. A microcontroller comprising:
    a central processing unit (CPU)
    a Controller Area Network (CAN) module,
    a timer;
    a capture module coupled with said timer;
    wherein the microcontroller is configured to automatically detect a CAN frequency by:
        measuring the period times between a plurality of falling or rising edges of a CAN signal;
        sorting said period times by their respective value;
        determining differences between adjacent period times of said sorted period times;

sorting said determined differences by their respective value;
selecting a first difference from said sorted difference values and determining a first frequency from said first difference;
initializing said CAN module using said selected frequency;
receiving a CAN signal frame;
determining whether an error occurred;
in response to said determining of an error, selecting a next difference and determining an associated frequency and repeating initializing the CAN module until a valid CAN frequency has been found.

13. The microcontroller according to claim 12, wherein the microcontroller is further configured to discard difference values that result in invalid frequencies.

14. The microcontroller according to claim 12, wherein the capture module comprises an edge detector controlling a driver which couples said timer with a capture register.

15. The microcontroller according to claim 12, comprising a controllable driver coupled between an input of the CAN Bus module and the input of said capture module.

16. The microcontroller according to claim 12, wherein the microcontroller is configured to determine a frequency from said difference value by using a look-up table.

17. The microcontroller according to claim 12, wherein the microcontroller is configured to determine a frequency from said difference value using rounding or truncation.

18. The microcontroller according to claim 12, wherein the microcontroller is programmed by software to determine said CAN frequency.

19. The microcontroller according to claim 12, comprising a state machine to determine said CAN frequency.

20. The microcontroller according to claim 19, comprising a special function register to control the state machine.

21. A method for initializing a Controller Area Network (CAN) module in a microcontroller,
the method comprising:
receiving a CAN signal comprising a plurality of consecutive periods;
measuring the plurality of consecutive period times of the CAN signal, wherein a period is defined as the time between two consecutive falling or two consecutive rising edges of the CAN signal;
sorting said period times by their respective value;
determining difference values between adjacent period times of said sorted period times;
sorting said difference values by their respective value;
selecting a first difference value from said sorted difference values and determining a first frequency from said first difference value;
initializing said CAN module using said selected frequency;
receiving a CAN signal frame;
determining whether an error occurred;
in response to said determining of an error, selecting a next difference value and determining an associated frequency and repeating initializing the CAN module until a valid CAN frequency has been found.

* * * * *